United States Patent
Varaprasad et al.

[11] Patent Number: 6,045,724
[45] Date of Patent: *Apr. 4, 2000

[54] LARGE AREA ELECTROCHROMIC WINDOW

[75] Inventors: Desaraju V. Varaprasad; Hamid R. Habibi; Niall R. Lynam; Padma Desaraju, all of Holland, Mich.

[73] Assignee: Donnelly Corporation, Holland, Mich.

[*] Notice: This patent is subject to a terminal disclaimer.

[21] Appl. No.: 09/035,623

[22] Filed: Mar. 5, 1998

Related U.S. Application Data

[63] Continuation of application No. 08/731,703, Oct. 17, 1996, Pat. No. 5,725,809, which is a continuation of application No. 08/566,507, Dec. 4, 1995, Pat. No. 5,567,360, which is a continuation of application No. 08/289,939, Aug. 12, 1994, Pat. No. 5,472,643, which is a continuation of application No. 07/878,176, May 4, 1992, Pat. No. 5,340,503, which is a division of application No. 07/443,113, Nov. 29, 1989, Pat. No. 5,140,455.

[51] Int. Cl.[7] ............................... G02F 1/00; G02F 1/153
[52] U.S. Cl. ............................................. 252/583; 359/275
[58] Field of Search .................................... 252/583, 586; 359/265, 272, 275

[56] References Cited

U.S. PATENT DOCUMENTS

| | | |
|---|---|---|
| 2,633,045 | 3/1953 | Sziklai . |
| 3,280,701 | 10/1966 | Donnelly et al. . |
| 3,282,157 | 11/1966 | Jones et al. . |
| 3,282,158 | 11/1966 | Jones et al. . |
| 3,282,160 | 11/1966 | Jones et al. . |
| 3,283,656 | 11/1966 | Jones et al. . |
| 3,451,741 | 6/1969 | Manos . |
| 3,453,038 | 7/1969 | Kissa et al. . |
| 3,652,149 | 3/1972 | Rogers . |
| 3,692,388 | 9/1972 | Hall, Jr. et al. . |
| 3,774,988 | 11/1973 | Rogers . |
| 3,806,229 | 4/1974 | Schoot et al. . |
| 3,854,794 | 12/1974 | Van Dam et al. . |
| 3,873,185 | 3/1975 | Rogers . |
| 3,912,368 | 10/1975 | Ponjee et al. . |

(List continued on next page.)

FOREIGN PATENT DOCUMENTS

| | | |
|---|---|---|
| 012419 | 6/1980 | European Pat. Off. . |
| 240226 | 10/1987 | European Pat. Off. . |
| 56-93742 | 7/1981 | Japan . |
| 56-93743 | 7/1981 | Japan . |
| 57-208530 | 12/1982 | Japan . |
| 57-208531 | 12/1982 | Japan . |
| 566860 | 8/1977 | Russian Federation . |
| 328017 | 5/1930 | United Kingdom . |
| 1314049 | 4/1973 | United Kingdom . |

OTHER PUBLICATIONS

Shelepin et al., "Electrochrosim of Organic Compounds II, Spectral and Electrochemical Examination of a system Based on Methylviologen and 5, 10–Dihydro–5, 10–Demethylphenazine," Eletrokimiya, vol. 13(3), 404–408 (Mar. 1977).

Ushakov et al. U.S. Hakov: "Electrochromism of Organic Compounds: Some Properties of Two–Electrode Cells," Elektrokimiya, vol. 14(2), 319–322 (Feb. 1978).

Hirai et al., "Electrochromism for Organic Materials in Polymeric All–Solid–State Systems," Appl. Phys. Lett., 43, (7), 704 (1983).

Primary Examiner—Philip Tucker
Attorney, Agent, or Firm—Van Dyke, Gardner, Linn & Burkhart, LLP

[57] ABSTRACT

The specification discloses electrochemichromic solutions and devices based on the use of solvents comprising at least about 25% 3-hydroxypropionitrile, 3,3'-oxydipropionitrile, 2-acetylbutyrolactone, 2-methylglutaronitrile, 3-methylsulfolane and mixtures thereof. The specification also discloses vacuum backfilling techniques for filling electrochemichromic cells and enhanced UV stability through solvent self-screening.

21 Claims, 8 Drawing Sheets

U.S. PATENT DOCUMENTS

| | | |
|---|---|---|
| 3,951,845 | 4/1976 | Cole, Jr. . |
| 4,090,782 | 5/1978 | Bredfeldt et al. . |
| 4,093,358 | 6/1978 | Shattuck et al. . |
| 4,139,276 | 2/1979 | Clecak et al. . |
| 4,210,390 | 7/1980 | Yaguchi . |
| 4,309,082 | 1/1982 | Kohara et al. . |
| 4,561,001 | 12/1985 | Gunn et al. . |
| 4,684,219 | 8/1987 | Cox et al. . |
| 4,752,119 | 6/1988 | Ueno et al. . |
| 4,795,242 | 1/1989 | Fred et al. . |
| 4,820,025 | 4/1989 | Nakanowatari . |
| 4,893,908 | 1/1990 | Wolf et al. . |
| 4,902,108 | 2/1990 | Byker . |
| 5,073,012 | 12/1991 | Lynam . |
| 5,140,455 | 8/1992 | Varaprasad et al. . |
| 5,151,816 | 9/1992 | Varaprasad et al. . |
| 5,280,380 | 1/1994 | Byker . |
| 5,294,376 | 3/1994 | Byker . |
| 5,336,448 | 8/1994 | Byker . |
| 5,340,503 | 8/1994 | Varaprasad et al. ............... 252/583 |
| 5,355,245 | 10/1994 | Lynam . |
| 5,725,809 | 3/1998 | Varaprasad et al. ............... 252/583 |

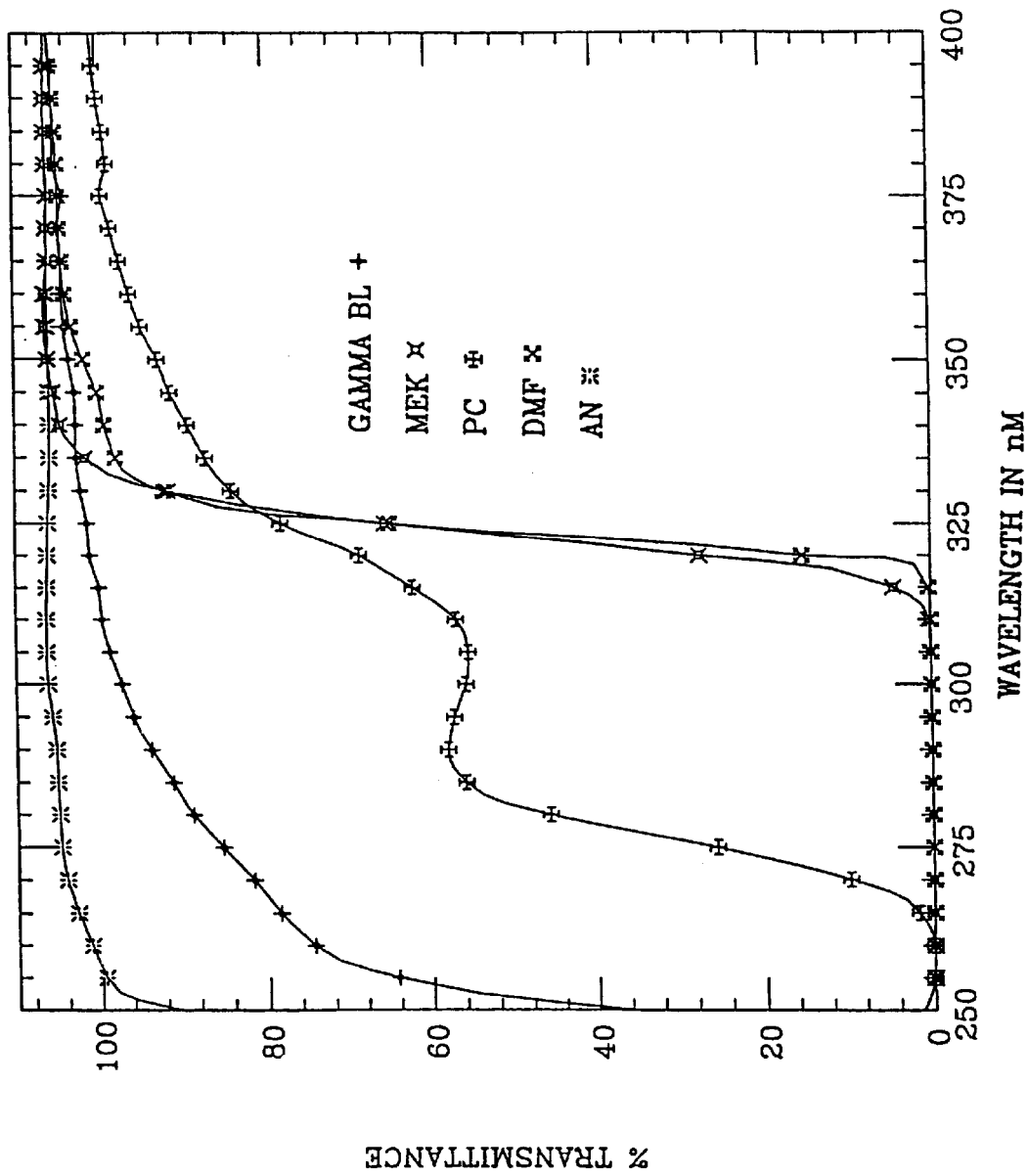

LARGE AREA ELECTROCHROMIC WINDOW

CROSS REFERENCE TO RELATED APPLICATIONS

This is a continuation of Ser. No. 08/731,703, filed Oct. 17, 1996 now U.S. Pat. No. 5,725,809, which is a continuation of Ser. No. 08/566,507, filed Dec. 4, 1995, now U.S. Pat. No. 5,567,360, which is a continuation of Ser. No. 08/289,939, filed Aug. 12, 1994, now U.S. Pat. No. 5,472,643, which is a continuation of Ser. No. 07/878,176, filed May 4, 1992, now U.S. Pat. No. 5,340,503, which is a division of Ser. No. 07/443,113, filed Nov. 29, 1989, now U.S. Pat. No. 5,140,455.

BACKGROUND OF THE INVENTION

The present invention relates to electrochemichromic solutions and devices based thereon. Such solutions are well-known and are designed to either color or clear, depending on desired application, under the influence of applied voltage.

Such devices have been suggested for use as rearview mirrors in automobiles such that in night driving conditions, application of a voltage would darken a solution contained in a cell incorporated into the mirror (U.S. Pat. No. 3,280,701, Oct. 25, 1966). Similarly, it has been suggested that windows incorporating such cells could be darkened to block out sunlight, and then allowed to lighten again at night. Electrochemichromic cells have been used as display devices and have been suggested for use as antidazzle and fog-penetrating devices in conjunction with motor vehicle headlamps (British Patent Specification 328017, May 15, 1930).

U.S. Pat. No. 4,090,782 to Bredfeldt et al., U.S. Pat. No. 4,752,119 to Ueno et al. (June 1988)., Chemical Abstract 86:196871c, 72-Electro. Chemistry, Vol. 86, 1977, I. V. Shelepin et al. in *Electrokhimya*, 13(3), 404–408 (March 1977), O. A. Ushakov et al., *Electrokhimya*, 14(2), 319–322 (February 1978), U.S.S.R. Patent 566863 to Shelepin (August 1977), U.S. Pat. No. 3,451,741 to Manos, European Patent-Publication 240,226 published Oct. 7, 1987 to Byker, U.S. Pat. No. 3,806,229 to Schoot et al., U.S. Pat. No. 4,093,358 to Shattuck et al., European Patent Publication 0012419 published Jun. 25, 1980 to Shattuck and U.S. Pat. No. 4,139,276 to Clecak et al. all disclose electrochemichromic solutions of anodic and cathodic electrochromically coloring components which provide self-erasing, high color contrast, single compartment cells. Such anodic and cathodic coloring components comprise redox couples selected to exhibit the following reaction:

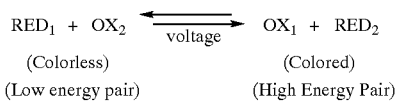

$$RED_1 + OX_2 \underset{voltage}{\rightleftarrows} OX_1 + RED_2$$

(Colorless)      (Colored)
(Low energy pair)      (High Energy Pair)

The redox couple is selected such that the equilibrium position of the mixture thereof lies completely to the left of the equation. At rest potential, the anodically coloring reductant species $RED_1$, and the cathodically coloring oxidant species $OX_2$ are colorless. To cause a color change, voltage is applied and the normally colorless $RED_1$ is anodically oxidized to its colored antipode $OX_1$, while, simultaneously, $OX_2$ is cathodically reduced to its colored antipode, $RED_2$. These cathodic/anodic reactions occur preferentially at the electrodes which, in practical devices, are typically transparent conductive electrodes. Within the bulk of the solution, the redox potentials are such that when $RED_2$ and $OX_1$ come together, they revert to their lower energy form. This means the applied potential need only suffice to drive the above reaction to the right. On removing the potential, the system reverts to its low energy state and the cell spontaneously self-erases.

Such redox pairs are placed in solution in an inert solvent. Typically, an electrolyte is also added. This solution is then placed into a relatively thin cell, between two conductive surfaces. In most applications, at least one of the conductive surfaces comprises a very thin layer of a transparent Conductor such as indium tin oxide (ITO), doped tin oxide or doped zinc oxide deposited on a glass substrate so that the cell is transparent from at least one side. If the device is to be used in a mirror, the second surface is typically defined by a relatively thin layer of transparent conductor such as indium tin oxide, doped tin oxide or doped zinc oxide deposited on another glass substrate, which is silvered or aluminized or otherwise reflector coated on its opposite side. In the case of solar control windows, the second glass substrate would of course not be silvered on its opposite side so that when the redox pair is colorless, the window would be entirely transparent.

A wide variety of cathodically coloring species, anodically coloring species, inert current carrying electrolytes and solvent systems are described in prior art. However, combinations of these suitable to meet the performance required for outdoor weathering, particularly for outdoor weathering of automobile rearview mirrors and automobile and architectural windows, have hitherto not been revealed. Nor have combinations been revealed that, in conjunction with possessing inherent UV stability, meet the temperature extremes required in commercial automotive and architectural applications. Nor have combinations been revealed that meet the UV resilience and temperature extremes required in automotive and architectural applications and that simultaneously have sufficiently low vapor pressures to facilitate use of a vacuum backfill technique to fill thin cells where the interpane spacing is very small. With higher vapor pressures, undesirable voids are left with the solution in the vacuum backfilled cell.

Vacuum backfilling has been used to fill liquid crystal displays. Liquid crystal displays are typically much smaller than the large areas of typical electrochemichromic devices such as mirrors and windows. Liquid crystal materials have inherently high viscosity and low vapor pressure. To fill with liquid crystal using the vacuum backfill technique, elevated temperatures are typically used so that the liquid crystal viscosity is sufficiently low that the material flows into and fills the cavity. Because of their inherent low vapor pressure even at elevated temperatures, voids are not a significant problem during backfilling with liquid crystals. The same is not true for many electrochemichromic solvents cited in the prior art.

Many of the organic solvents proposed in the prior art as solvents for electrochemichromic compounds have disadvantages when chosen for UV resilient devices. This is because commonly suggested solvents, such as acetonitrile, propylene carbonate, gamma-butyrolactone, methyl ethyl ketone, dimethylformamide and the like, are highly transmissive to UV radiation. Incoming UV radiation that is admitted by the ITO-coated glass substrate is unattenuated by the solvent and thus is capable of photolyzing or otherwise degrading any UV vulnerable solute in solution in that solvent.

Addition of UV stabilizers such as benzotriazoles, benzophenones, or hindered amine complexes, as known in prior art, can help increase solution stability to UV radiation, but there are limitations and disadvantages to addition of UV stabilizers. Because they are held in solutions of low to moderate viscosity, both the UV stabilizer and the electrochemichromic solutes are free to randomly move about in the solution. Thus, an incoming photon of UV radiation may impinge and thus degrade an electrochemichromic solute species rather than be absorbed by a UV absorber in solution. Also, solubility within the selected solvent places limits on the amount of UV stabilizer that can be added.

Solute solubility is also a factor in connection with the choice of solvents for electrochemichromic components. High solubility is preferred for the anodic and cathodic species as well as for electrolytes which are usually added to such solutions. Such electrolytes enhance cell performance and must be soluble in the solvent.

Yet another problem encountered in electrochemichromic devices relates to current leakage. When the electrochemichromic cell is colored by the application of voltage, the colored species $OX_1$ and $RED_2$ continually want to recombine and return to their equilibrium, colorless condition. The rate of recombination of the colored species $OX_1$ and $RED_2$ within the bulk of the solution is directly proportional to their diffusion coefficient in the solvent used. In order to compensate for the tendency of the colored species to recombine and go to the colorless equilibrium state, current must continually leak into the electrochemichromic solution via the conductive electrodes that typically sandwich said solution.

Because current must flow across the conductive surface of the transparent conductor used on at least one of the substrates that sandwich the electrochemichromic cell, and because these transparent conductors have finite sheet resistance, applied potential will be highest adjacent to the bus bar connector typically located at an edge perimeter and will be lowest near the center of the device as current passes across the conductive glass surface to color remote regions. Thus, if the leakage current Is high and/or the sheet resistance of the transparent conductor is high, the potential drop that ensues across the transparent conductor itself results in a lower potential being applied to remote regions. Coloration is therefore nonuniform with the edge regions nearest the bus bar coloring deepest and the central regions coloring lightest. Such nonuniformity in coloration is commercially undesirable. For a given transparent conductor sheet resistance, the lower the leakage current the more uniform the coloration. This is an important advantage; otherwise, a thicker and hence more costly and less transparent conductive coating would be needed to reduce the sheet resistance to accommodate the higher leakage currents seen with solvents suggested in the prior art.

Yet another disadvantage of higher leakage currents is their imposition of a drain on battery-power sources in some instances. If an electrochemichromic device were used in a sunroof, for example, it would be desirable to have the sunroof colored dark while the car is parked in a parking lot. If the current leakage is too great, the operator could find that the car battery has been drained as a result of current being drawn by the colored sunroof.

One further problem which plagues electrochemichromic devices is "segregation." When first bleached after being held for a prolonged period in the colored state, bands of color are seen adjacent to the bus bar connectors to the transparent conductive electrodes that sandwich the, electrochemichromic solution. In electrochemichromic solutions revealed in prior art, various methods must be used to reduce segregation. These include thickening the electrochemichromic solution, use of low concentrations of electrochemichromically active species, and use of high concentrations of current-carrying electrolyte. The addition of thickeners will also reduce leakage current. One problem with adding thickeners is that the solution can become so viscous that vacuum backfilling a thin electrochemichromic cell becomes commercially unfeasible.

As a result of these drawbacks, electrochemichromic solutions and devices based thereon have not achieved the degree of commercial success which they potentially could achieve.

SUMMARY OF THE INVENTION

The present invention comprises an electrochemichromic solution and devices, based on the use of a solvent comprising at least about 25% by volume of a solvent selected from the group consisting of 3-hydroxypropionitrile (HPN), 3,3'-oxydipropionitrile (ODPN), 2-acetylbutyrolactone (ABL), 2-methylglutaronitrile (MGNT), 3-methylsulfolane (MS) and mixtures thereof. The foregoing solutions exhibit unexpectedly lower current leakage and generally superior UV characteristics, either alone or with UV stabilizers added. Segregation is minimized without excessive solution viscosity increase.

Segregation is minimized without the necessity of adding thickeners which cause excessive viscosity increase. Also, excellent performance in both cycle behavior and in segregation performance can be achieved using low concentration of added inert electrolyte. These and other objects, advantages and features of the invention will be more fully understood and appreciated by reference to the written specification and appended drawings.

BRIEF DESCRIPTION OF THE DRAWINGS

FIG. 8 is a graph of the percent transmittance of solar radiation at various wavelengths by prior art solvents for electrochemichromic solutions.

DESCRIPTION OF THE PREFERRED EMBODIMENT

Introduction

The electrochemichromic solutions of the preferred embodiment can utilize conventional or equivalent redox systems such as the viologens combined with phenazines, diamines or benzidines, dissolved in a solvent comprising at least 25% by volume of one or more of the solvents of the present invention: 3-hydroxypropionitrile (HPN), 3,3'-oxydipropionitrile (ODPN), 3-methylsulfolane (MS), 2-methylglutaxonitrile (MGNT) and 2-acetylbutyrolactone (ABL). Electrolytes may optionally be used and are preferably used.

Viologens are preferred cathodic materials for the redox pair. Methylviologen, ethylviologen, benzylviologen and heptylviologen are all satisfactory, with a 0.025 molar solution of methylviologen being preferred. Higher concentrations up to the solubility limits are also operable. In the structural formulas set forth below, X⁻ represents the anion of the viologen salt. Various anions are disclosed in the literature, though we have discovered that the most preferred anion is hexafluorophosphate ($PF_6^-$) because it surprisingly enhances viologen solubility. This preferred embodiment will be the subject of a copending U.S. patent application to be entitled ELECTROCHEMICHROMIC VIOLOGENS.

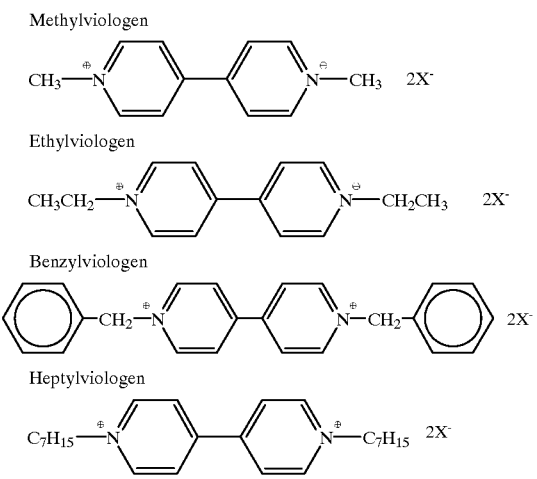

Hexafluorophosphate counter ion is listed below with other acceptable, though less preferred, counter ions for use on the viologens:

| | |
|---|---|
| Tetrafluoroborate | $BF_4^-$ |
| Perchlorate | $ClO_4^-$ |
| Trifluormethane sulfonate | $CF_3SO_3^-$ |
| Hexafluorophosphate | $PF_6^-$ |

The preferred anodic coloring materials are set forth below:
DMPA - 5,10-dihydro-5,10-dimethylphenazine
DEPA - 5,10-dihydro-5,10-diethylphenazine     R = CH₃
DOPA - 5,10-dihydro-5,10-dioctylphenazine     R = C₂H₅
                                              R = C₈H₁₇

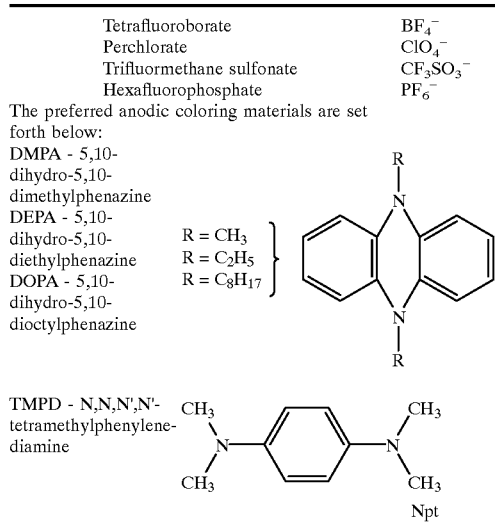

TMPD - N,N,N',N'-tetramethylphenylenediamine

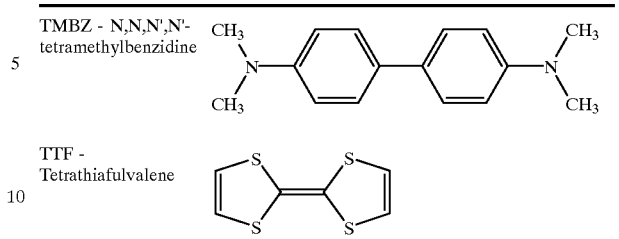

TMBZ - N,N,N',N'-tetramethylbenzidine

TTF - Tetrathiafulvalene

Most preferred is a 0.025 molar solution of 5,10-dihydro-5,10-dimethylphenazine (DMPA).

Numerous electrolytes can be used in the present invention. One which is often suggested for electrochemichromic cells and which is acceptable in accordance with the preferred embodiment of the invention is a tetrabutylammonium hexafluorophosphate. We prefer a 0.025 molar solution.

UV stabilizers such as Uvinul™ 400 at approximately 5% weight by volume can also be used in the solutions of the present invention. As explained below, such UV stabilizers are more preferably used in connection with some of the solvents of the present invention than others.

The best mode electrochemichromic solution contemplated for practicing the invention comprises one of the solvents of this invention, containing 0.025 molar methylviologen hexafluorophosphate, 0.025 molar tetrabutylammonium hexafluorophosphate, and 0.025 molar 5,10-dihydro-5,10-dimethylphenazine (DMPA).

Figure 2:
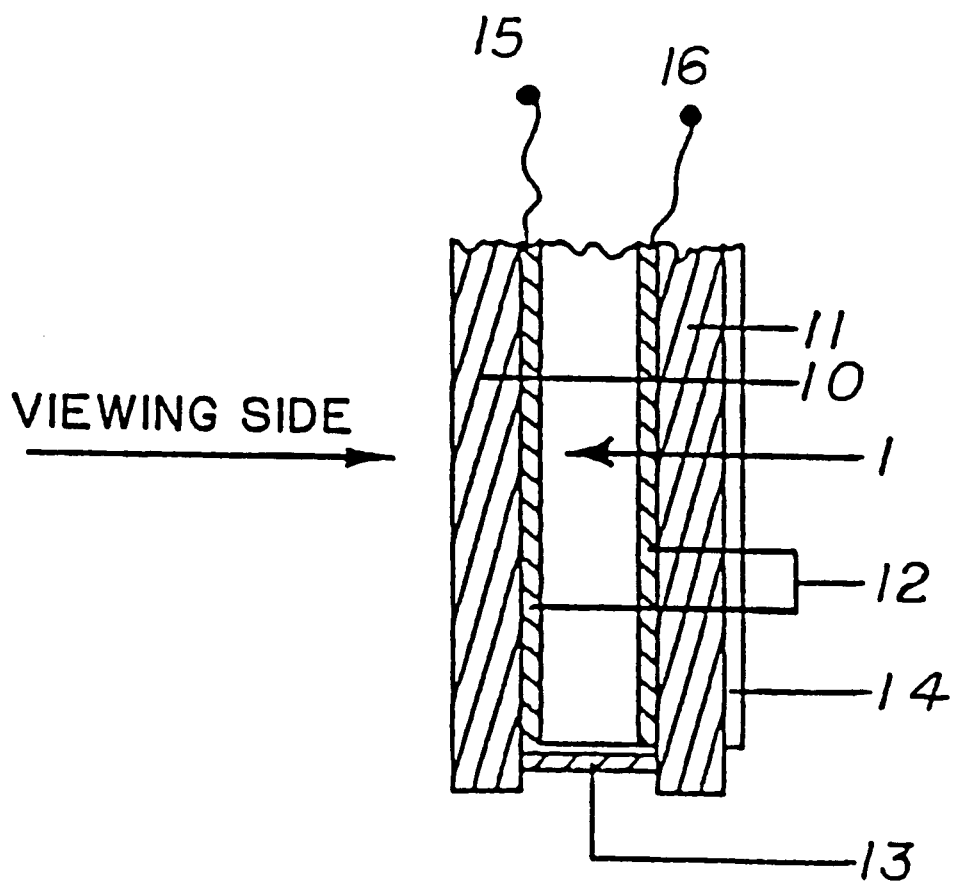
FIG. 2 is a cross-sectional view of an electrochemichromic cell.

FIG. 2 illustrates a typical electrochemichromic cell 1 into which solutions of the present invention are typically filled. Cell 1 comprises a pair of glass plates 10 and 11 each coated on its inwardly facing surface with a half wave indium tin oxide (ITO) coating 12 of about 15 ohms/square sheet resistance. Plates 10 and 11 are separated by peripheral seal 13 so that the interior of the cell has a thickness of 150 microns. Cell 1 is sealed at its perimeter by peripheral seal 13. Seal 13 comprises an epoxy material, to which 150 micron diameter spacers are added, and silk-screened to a thickness of about 150 microns. Glass beads are used as spacers. As shown, cell 1 is intended to be used as a mirror, and thus the rear surface of glass plate 11 is coated with a silver reflector layer 14. If the device were used as a window, layer 14 would be deleted. The conductive indium tin oxide layers 12 are connected to electrical terminals 15 and 16 so that a voltage can be established across a solution located between plates 10 and 11 in cell 1.

To vacuum backfill call 1, a small gap is introduced into seal 13 at some extremity corner. This acts as a fill hole. Solution can be filled through this hole and once inside the cell, the solution is contained by seal 13. between glass substrates 10 and 11. It is desirable to use a small fill hole so that the entrance orifice is small. Otherwise, it is difficult to seal the fill hole once the cell cavity is full such that no leaks occur through the fill hole. But since the fill hole is small, less than 1 mm×1 mm×150 microns typically, it is difficult to fill the call cavity using a hypodermic needle or the like. Also, since there is only one fill hole, back pressure would impede complete filling through one fill hole anyway. Thus a means is needed to fill such a cell cavity that overcomes the above problems. Vacuum backfilling is such a means.

In the vacuum backfill technique, the empty cell is placed in a vacuum chamber along with a container (typically a dish or small cup) of the electrochemichromic fluid intended to be filled through the single fill hole into the cell cavity. The chamber is evacuated to a high vacuum, 1 mm Hg or better. Means are then used to lower the fill hole just under the surface of the electrochemichromic fluid. The chamber is now vented to atmospheric pressure (typically using nitrogen or similar inert gas). Atmospheric pressure forces the fluid into the cell cavity and so fills it. However, how completely it fills is a function both of the vacuum pressure upon evacuation $P_V$ and the atmospheric pressure $P_A$ to which the chamber is vented during venting.

Although a vacuum pump can evacuate a vacuum chamber to $10^{-6}$ mm Hg or better, the vapor pressure of the solvent limits how high a vacuum can be achieved. This is because the vacuum pump reduces the vacuum pressure down to the vapor pressure (at the temperature of the chamber) or the fluid used. Once the vacuum pressure equals the vapor pressure, vacuum pressure will go no lower until all the fluids have evaporated. Thus the choice of solvent, through its vapor pressure, dictates how large a bubble will remain after backfilling a given call volume. As the device area increases such as might be encountered in window devices, the problem gets worse and, unless a sufficiently low vapor pressure solvent is chosen, or unless means such as cooling the fluid and chamber (to reduce vapor pressure) or overpressuring during backfill (to force more fluid in) are employed, a cosmetically unacceptable bubble will be left within the electrochemichromic cell. While a small bubble of about 1 mm diameter may dissolve over time, a larger bubble will not completely disappear. Further, if the viscosity of the fluid to be filled is very high, then it may be difficult to fill at room temperature. If higher filling temperatures are used, the residual bubble may be larger as the vapor pressure increases with temperature. Simple physics teaches that:

$$P_A V_A = P_V V_V \quad (1)$$

where $P_A$=pressure to which the chamber is finally vented.

$V_A$=volume of gas trapped in the cell after completely filling the cell.

$P_V$=vacuum pressure in the chamber after evacuation and prior to filling.

$V_V$=volume of the empty cavity, i.e., cell volume.

Since undissolved gas trapped in the cell after incomplete filling will usually form a bubble, then $V_A$ can be written as:

$$V_A = \pi/4 \, d^2 t \quad (2)$$

where d is the bubble diameter and t is the cell cavity thickness.

Also, $P_A$ is usually 760 mm Hg although it is important to stress that the chamber can be overpressured to several atmospheres or more after filling if it is desired to fill more completely. However, in the case where $P_A$ 760 mm Hg and where $V_V$=A×t where A is the call area and t is the interpane thickness, we have:

$$P_V \cdot A \cdot t = 760 \cdot \pi/4 \cdot d^2 \cdot t \quad (3)$$

which reduces to $$P_V = 5.969 \, d^2/A \quad (4)$$

where d is in mm and A is in cm$^2$

Likewise $$d = \sqrt{(P_V \times A)/5.969} \quad (5)$$

Equation (4) expresses the relationship between the residual gas bubble diameter d (in mm) and the cell area (in cm$^2$) to the pressure in the chamber, $P_V$, prior to venting to atmosphere and thus backfilling.

Note that if two solvents or more are mixed together to form an ideal solution, the vapor pressure of the solution is simply the sum of the vapor pressures of each component. The solvents taught in this invention have very low vapor pressures, in some cases exceptional so that they are excellent choices for use as solvent components in electrochemichromic solutions intended to be vacuum backfilled. This is particularly important when large area devices such as 1 m$^2$ windows where the volume of cell cavity can be as large as 150 cc or thereabouts. By contrast, many of the prior art solvents, such as acetonitrile, methylethylketone, and dimethylformamide are, unsuitable choices, even for use as components in solvent mixtures. Also, note that the solutions used as electrochemichromic fluids are sufficiently dilute for the various solutes (anodic/cathodic compounds, electrolyte, etc.) not to significantly depress vapor pressures.

Lower boiling point solvents such as acetonitrile, dimethylformamide and methylethylketone tend to have relatively high vapor pressures at room temperature. Thus, the higher boiling point solvents of the present invention, which tend to have lower vapor pressures at room temperature, are significantly more suitable for the vacuum backfilling technique of the present invention. They tend to leave smaller bubbles in the filled cell.

2-acetylbutyrolactone is most desirable, since its boiling point is so high that it is measurable at atmospheric pressure only with great difficulty. Even at 5 mm Hg (0.0066 Atm), it boils at 107° C. Thus, ABL vapor pressure is so low that it is most preferable of the solvents of this invention for purposes of vacuum backfilling.

The Experimental Data, Tables 1, 2 And 3

Table 1 compares the solvents of the present invention to three conventionally suggested prior art electrochemichromic solvents: propylene carbonate, gamma butyrolactone and dimethylformamide. The first and second columns report boiling point and freezing point for the various solvents, including those of the present invention. The third column indicates the appearance of electrochemichromic solutions at zero applied potential made in accordance with the present invention in an electrochemichromic cell.

Electrochemichromic cell 1 (FIG. 2) was used for the data contained in the third column of Table 1 and the data in Table 2. Cell area was about 110 cm$^2$ and thickness was about 150 microns. Sheet resistance of the ITO transparent conductors used in the cell was 15 ohms per square. For Table 2, the cells were powered to 1 volt. Each cell was filled with a solution of the indicated solvent or solvent combination, containing 0.025 molar methylviologen perchlorate, 0.025 molar 5,10-dihydro 5,10-diaethylphenazine and 0.025 molar tetraethylammonium perchlorate unless otherwise indicated in the Table. Conventional techniques were used to ensure the solutions were oxygen free and were anhydrous. Table 2 compares electrochemichromic solutions which are identical in all respects, except that different solvents are used. Propylene carbonate (PC), gammabutyrolactone (GBL), dimethylformamide (DMF) and acetonitrile (AN), conventional solvents, are compared to 3-hydroxypropionitrile (HPN), 3,3'-oxydipropionitrile (ODPN), 3-methylsulfolane (MS), 2-methylglutaronitrile (MGNT) and 2-acetylbutyrolactone (ABL).

The first four data columns of Table 2 report reflectivity data. Reflectivity is measured in a conventional manner using standard illuminant A and a photodetector that reproduces the eye's photopic response and is expressed as a percentage of incident light which is reflected by the mirror. The first data column discloses the high percentage reflectivity as measured when the electrochemichromic solution is at zero potential and thus is colorless. The second column measures the low percent reflectivity, which is determined when the electrochemichromic solution is colored at 1 volt applied potential.

The third column measures the time in seconds that it takes for the solution to color from 70% reflectivity to 20% reflectivity. The fourth column indicates in seconds the time it takes for the solution to bleach from 10% reflectivity to 60% reflectivity. The fifth column of Table 2 measures current leakage for the fully colored solution presented in amperes per square meter.

Table 3 discloses the solubility of various UV stabilizers in the solvents of the present invention as compared to a prior art solvent, propylene carbonate. In most instances, the UV stabilizers are substantially more soluble in the solvents of the present invention, the only exception being that Tinuvin P™ is only marginally soluble in any of the solvents and Uvinul N-539™ is mostly immiscible with HPN.

TABLE 1

| Solvent | Boiling Point | Freezing Point | Color In Cell |
|---|---|---|---|
| Propylene carbonate | 240° C. | −55° C. | Clear and Colorless |
| (PC) (Prior art) | | | |
| γ-Butyrolactone | 205° C. | −45° C. | Clear and Colorless |
| (γ-BL) (Prior art) | | | |
| Dimethylformamide | 153° C. | −61° C. | Clear and Colorless |
| (DMF) (Prior art) | | | |
| 3-Hydroxypropionitrile or 2-cyanoethanol or hydracrylonitrile HOCH₂CH₂CN (HPN) | 228° C. | −46° C. | Clear and Colorless |
| 3,3'-oxydipropionitrile O(CH₂CH₂CN)₂ (ODPN) | 188° C./ 16 mm Hg | −26° C. | Clear and Colorless |
| 2-acetylbutyrolactone (ABL) | 107° C./ 5 mm Hg | <−33° C. | Clear and Colorless |

TABLE 1-continued

| Solvent | Boiling Point | Freezing Point | Color In Cell |
|---|---|---|---|
| (α-acetobutyrolactone) | | | Clear and Colorless |
| 2-methylglutaronitrile (MGNT) CH₃ NCCH₂CH₂CHCN | 125–130° C./ 10 mm Hg | <−33° C. | Clear and Colorless |
| 3-methylsulfolane (MS) | 276° C. | −10° C. | Clear and Colorless |

TABLE 2

| | HI %R | LOW %R | Color 70%–20%R Sec | Bleach 10%–60%R Sec | Leakage Current A/m² |
|---|---|---|---|---|---|
| PC (prior art) | 80.6 | 8.3 | 4.5 | 4.8 | 7.18 |
| GBL (prior art) | 78 | 15.1 | 7.1 | 3.4 | 5.6 |
| DMF (prior art) | 81.3 | 27.2 | 8.75 | 1.54 | 8.40 |
| *AN (prior art) | 81 | 43 | 1.5 | 1.5 | 9.8 |
| HPN | 81.5 | 7.5 | 3.7 | 5.43 | 6.76 |
| ODPN | 80.3 | 6.1 | 3.7 | >10 | 2.68 |
| ABL | 80.1 | 6.7 | 3.9 | 9.4 | 3.83 |
| MS | 81.5 | 7.4 | 5.0 | >10 | 1.54 |
| **MGNT | 80.2 | 7.6 | 4.5 | 9.34 | 3.1 |
| PC/ODPN | | | | | |
| 75/25 | 81.4 | 7.1 | 4.12 | 5.51 | 5.88 |
| 50/50 | 80.7 | 6.3 | 3.67 | 7.84 | 4.79 |
| 25/75 | 80.9 | 6.55 | 4.03 | 8.86 | 3.75 |
| PC/ABL | | | | | |
| 75/25 | 80.2 | 7.4 | 4.07 | 5.99 | 7.16 |
| 50/50 | 80.8 | 6.9 | 3.89 | 6.78 | 5.79 |
| 25/75 | 80.5 | 6.95 | 4.25 | 6.86 | 5.25 |
| HPN/ODPN | | | | | |
| 75/25 | 79.4 | 6.8 | 3.84 | 5.63 | 6.28 |
| 50/50 | 79.6 | 6.55 | 3.51 | 7.28 | 4.79 |
| 25/75 | 79.8 | 6.95 | 3.78 | 7.70 | 4.26 |
| HPN/ABL | | | | | |
| 75/25 | 79.1 | 7.4 | 4.8 | 5.97 | 5.21 |
| 50/50 | 79.0 | 6.7 | 4.3 | 7.98 | 4.65 |
| 25/75 | 79 | 7.0 | 4.6 | 8.04 | 4.3 |
| ODPN/ABL | | | | | |
| 75/25 | 78.6 | 6.9 | 6.1 | 12.45 | 2.84 |
| 50/50 | 80.7 | 6.6 | 4.54 | 11.3 | 3.09 |
| 25/75 | 80.2 | 7.2 | 5.7 | 9.44 | 3.42 |
| HPN/MGNT | | | | | |
| 50/50 | 79.1 | 7.1 | 3.52 | 5.85 | 4.75 |

TABLE 2-continued

|  | HI %R | LOW %R | Color 70%–20%R Sec | Bleach 10%–60%R Sec | Leakage Current A/m² |
|---|---|---|---|---|---|
| HPN/MS |  |  |  |  |  |
| 50/50 | 79.1 | 7.0 | 4.31 | 7.07 | 4.48 |
| 75/25 | 80.5 | 7.3 | 4.88 | 4.12 | 5.2 |
| HPN/ABL/-ODPN |  |  |  |  |  |
| 35/50/15 | 80.6 | 6.7 | 3.6 | 6.6 | 5.25 |

*Counterion is tetrafluoroborate instead of perchlorate
**Counterion is hexafluorophosphate
AN = Acetonitrile
GBL = Gammabutyrolactone
PC = Propylene Carbonate
HPN = 3-Hydroxypropionitrile
ODPN = 3,3'-Oxydipropionitrile
ABL = 2-acetylbutyrolactone
MS = 3-methylsulfolane
MGNT = 2-methylglutaronitrile
DMF = Dimethylformamide

TABLE 3

Solubility of UV stabilizers
All data is wt/vol % and at room temperature.

|  | PC | ABL | GNT | ODPN | HPN | MGNT |
|---|---|---|---|---|---|---|
| Tinuvin P ™ | 1.7 | 0.5 | 0.4 | 0.7 | <0.2 | 0.9 |
| Uvinul 400 ™ | 11.9 | 21.5 | 12.6 | 7.6 | 14.9 | 11.3 |
| Cyasorb 24 ™ | 13.7 | 33.5 | 15.5 | 15.0 | 20.9 | 28.6 |
| Uvinul N-539 ™ | 33.6 | 35.9 | 35.9 | 40.2 | Immiscible | 37.3 |

Tinuvin P ™ = 2-(2H-benzotriazole-2-yl)-4-methylphenyl Ciba Geigy, Hawthorne, New York
Uvinul 400 ™ = 2,4-dihydroxy-benzophenone BASF Wyandotte Corp., Wyandotte, MI
Cyasorb 24 ™ = 2,2'-dihydroxy-4-methoxybenzophenone American Cyanamid Company, Wayne, NJ
Uvinul N-539 ™ 2-ethylhexyl-2-cyano-3,3-diphenylacrylate (Note: a liquid) BASF Wyandotte, Wyandotte, MI
PC = Propylene Carbonate
ABL = 2-acetylbutyrolactone
GNT = Glutaronitrile
ODPN = 3,3'-Oxydipropionitrile
HPN = 3-Hydroxypropionitrile
MGNT = Methylglutaronitrile 3-Hydroxypropionitrile (HPN)

3-Hydroxypropionitrile has a boiling point of 228° C. and hence can withstand the high temperatures which can be generated by a mirror or the like sitting in the sun (Table 1). Similarly, it has a freezing point of –46° C. and thus will not freeze in cold winter weather. Electrolytes show excellent solubility, i.e., greater than 0.05 molar. The solutions are clear in an electrochemichromic cell. Further, 3-hydroxypropionitrile is a relatively inexpensive solvent, thus affording economies which are comparable to that obtained by using propylene carbonate.

UV stabilizers, like the electrolytes also show excellent solubility in HPN. This makes it possible to enhance UV stability of HPN electrochemichromic solutions. Both Uvinul 400™ and Cyasorb 24™ show superior solubility in HPN as compared to propylene carbonate.

HPN electrochemichromic solutions exhibit a high percentage reflectivity in their bleached condition (81.5%, Table 2). Similarly, their reflectivity when colored is low, i.e., 7.5%. HPN solutions also tend to color fast (3.7 seconds), and they bleach satisfactorily.

One of the most important advantages of HPN solutions over propylene carbonate solutions is their lower current leakage. The HPN solution of Table 2 exhibits leakage of 6.76 amperes per square meter versus 7.18 amperes per square meter for a comparable propylene carbonate solution (Table 2).

3,3'-Oxydipronionitrile 3,3'-Oxydipropionitrile (ODPN) has a boiling point of 188° C. even at 16 mm Hg (0.021 Atm) and a freezing point of –26° C. (Table 1). This spread minimizes the probability of either overheating or freezing difficulties in extreme climate conditions. Electrolytes show excellent to good solubility in ODPN (i.e., greater than 0.05 molar). The same is true for UV stabilizers. The ODPN solutions are clear and colorless in an electrochemichromic cell. Like HPN, ODPN is a relatively economical commodity.

Referring to Table 2, it can be seen that ODPN also shows an excellent spread in reflectivity from high to low. It colors rapidly and, while it bleaches somewhat more slowly than HPN solutions, ODPN solutions exhibit a very low leakage current at 2.68 amperes per square meter.

Referring to Table 3, it will be seen that Uvinul 400™, Cyasorb 24™, and Uvinul N-539™, all well-known and popular UV stabilizers, show superior solubility in ODPN as compared to propylene carbonate.

2-acetylbutyrolactone (ABL)

ABL boils at 107° C. even at a vacuum as great as 5 mm Hg (0.0066 Atm) and freezes at lower than –33° C. This is an excellent boiling point/freezing point range. The high boiling point and low vapor pressure of this material makes it excellent for vacuum backfilling. ABL also shows excellent self-screening UV characteristics (discussed below).

ABL solutions show an excellent spread between high and low reflectivity (80.1 to 6.7 as reported in Table 2). They color rapidly (3.9 seconds) and bleach fairly rapidly at 9.4 seconds. The current leakage is also desirably low at 3.83 amps per square mater.

Referring to Table 3, it will be seen that Uvinul 400™, Cyasorb 24. and Uvinul N-539™ all show superior solubility in ABL as compared to propylene carbonate.

2-methylglutaronitrile (MGNT)

2-methylglutaronitrile also has an extremely high boiling point. Even at 10 mm of mercury (0.013 atmospheres) it boils at 125 to 130° C. Its extremely low freezing point of less than –33° C. gives this solvent excellent environmental range. The high boiling point and low vapor pressure also make it excellent for facilitating vacuum backfilling.

Leakage current is extremely low for this solvent at 3.1 amperes per square meter. Even when used 50:50 with HPN in the solutions of Table 2, it has a leakage current of only 4.75 amps per square meter. Similarly, the percent reflectance range for the 50:50 solvent combination is excellent, as are the color and bleach times (Table 2).

3-methylsultolane (MS)

3-methylsulfolane boils at 276° C. and freezes at –10° C. (Table 1). This gives this solvent and its solutions excellent temperature stability. The high boiling point also ensures a relatively low vapor pressure, making this an excellent solvent for use in vacuum backfilling applications.

Electrochemichromic solutions based on this solvent exhibit the best low leakage current at 1.54 amperes per square meters Even in a 50:50 mix with HPN, the Table 2 solutions show a leakage current of 4.48 amperes per square meter. At 75% HPN/25% MS, the leakage current is still only 5.2 amps per square meter.

The reflectance range from high to low is very acceptable for this solvent (Table 2). Similarly, the time to color is fast and although bleach is somewhat slow, the bleach response time would be very acceptable in window applications, particularly large area windows which benefit from the extremely low leakage current of MS (Table 2).

Solvent Mixtures

The Table 2 data demonstrates that the solvents of the present invention also work well in combination with each other and in combination with prior art solvents. Thus, the inherent properties of prior art solvents are enhanced when they are combined with a solvent of the present invention wherein the combination comprises at least about 25% by volume of the solvent of the present invention.

The Table 2 results for propylene carbonate alone should be compared to the results achieved for propylene carbonate combined with 25%, 50% and 75% by volume ODPN and ABL. In each case, the combination of propylene carbonate with one of the solvents of the present invention shows a more desirable leakage current over propylene carbonate per se, without a significant degradation in clear to colored spread, time to color or time to bleach.

Table 2 also discloses the combination of HPN and ODPN. It can be seen that the properties of this combined solution at 75:25, 50:50 and 25:75 are superior in terms of low leakage current to those of HPN alone. Yet, the colored to uncolored light transmission spread is still exceptional. The time to color and the time to bleach are similarly superior to the performance achieved by ODPN alone.

Table 2 further discloses combinations of various other solvents of the present invention. Thus, beneficial combinations are seen involving HPN and ABL, ODPN and ABL, HPN and MGNT and HPN and MS. In all cases, the results in terms of high and low reflectance, time to color, time to bleach and leakage current are exceptional.

Finally, Table 2 illustrates that even more complex mixtures of the solvents of the present invention yield complementary and desirable results. Thus, Table 2 includes data obtained using electrochemichromic solution in 35% HPN, 50% ABL and 15% ODPN. As with other combinations shown in Table 2 involving the present invention, the results are exceptional.

Thus by using blends of the solvents of the present invention either with each other or with prior art solvents, one can obtain a combined solvent with desirable attributes of both. The faster times to color and bleach of a prior art solvent such as propylene carbonate can be combined with the lower leakage current of solvents such as MS, ODPN or ABL by incorporating at least about 25% of a solvent in accordance with the present invention.

Prior Art Solvents

Referring to the prior art solvents, it can be seen that except for gammabutyrolactone (GBL), they all have a relatively high leakage current, i.e., in excess of 7.18 amps per square meter. While GBL has a relatively low leakage current, its low end light transmittance, i.e., transmittance when colored, is relatively high. In the electrochemichromic mirror as described, it exhibits 15.1% reflectance, as distinguished from less than 10% reflectance for electrochemichromic mirrors made using solvents of the present invention. GBL also has a relatively high vapor pressure, i.e., 3.2 mm Hg at 25° C., making vacuum backfilling difficult. Dimethylformamide (DMF) and acetonitrile (AN) performed even worse in terms of percent reflectivity when colored (i.e., 27.2% and 43% respectively).

There is one solvent suggested in the prior art which does perform comparably to the solvents of the present invention. U.S. Pat. No. 3,806,229 to Schoot suggests the use of glutarodinitrile (glutaronitrile) as a solvent along with acetonitrile, propionitrile, benzonitrile, propylene carbonate, nitromethane and acetic acid anhydride. Glutaronitrile does show reduced current leakage and self-screening UV characteristics comparable to the solvents claimed herein. However, these favorable properties are totally unappreciated by Schoot and are not disclosed in U.S. Pat. No. 3,806,229. Accordingly, the use of glutaronitrile to achieve these desirable properties will be the subject of a copending United States patent application.

Self-Shielding UV Stabilization

Figure 1:
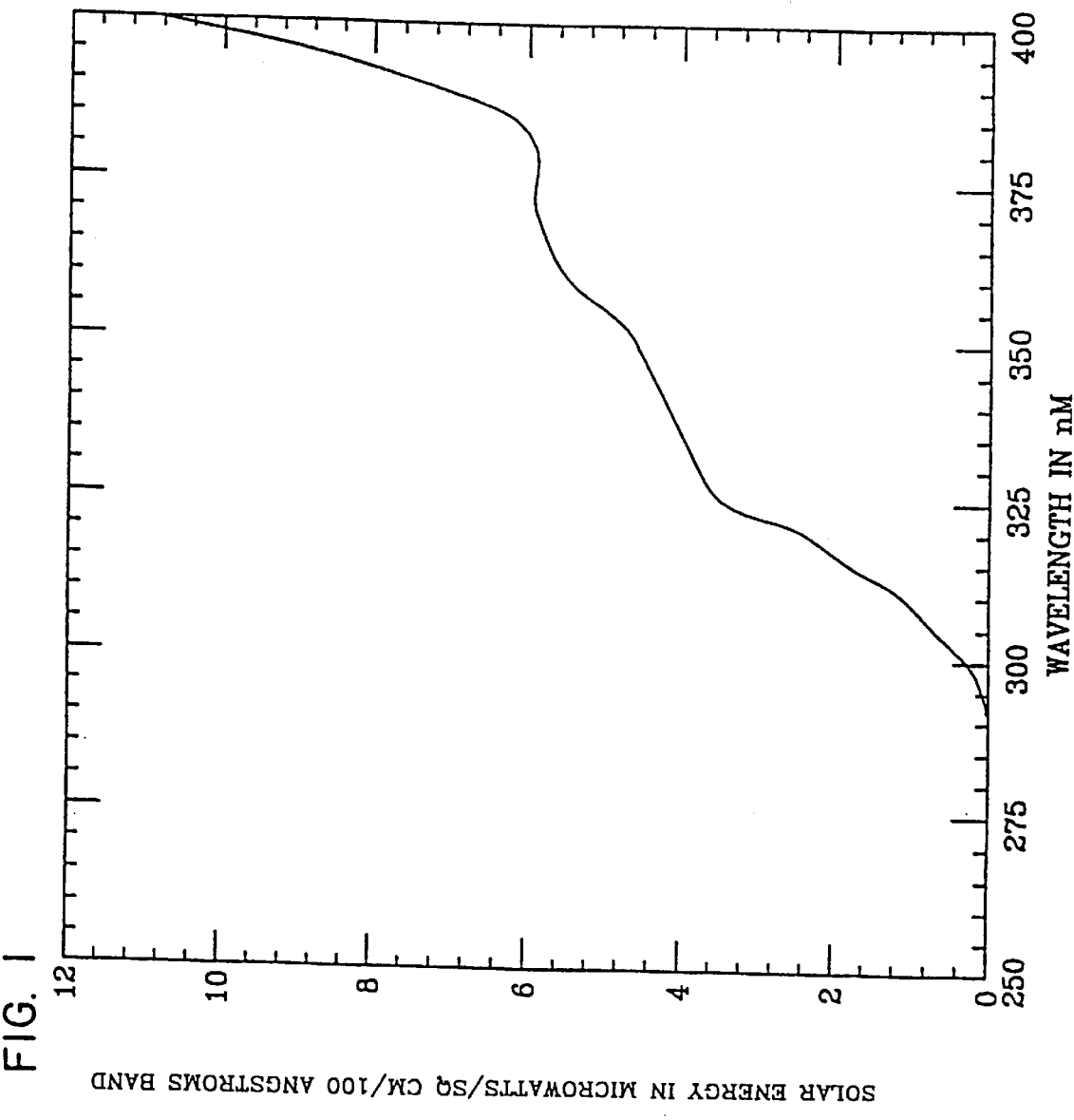
FIG. 1 is a solar spectrum in the ultraviolet region as determined in Tucson, Ariz.
Figure 3:
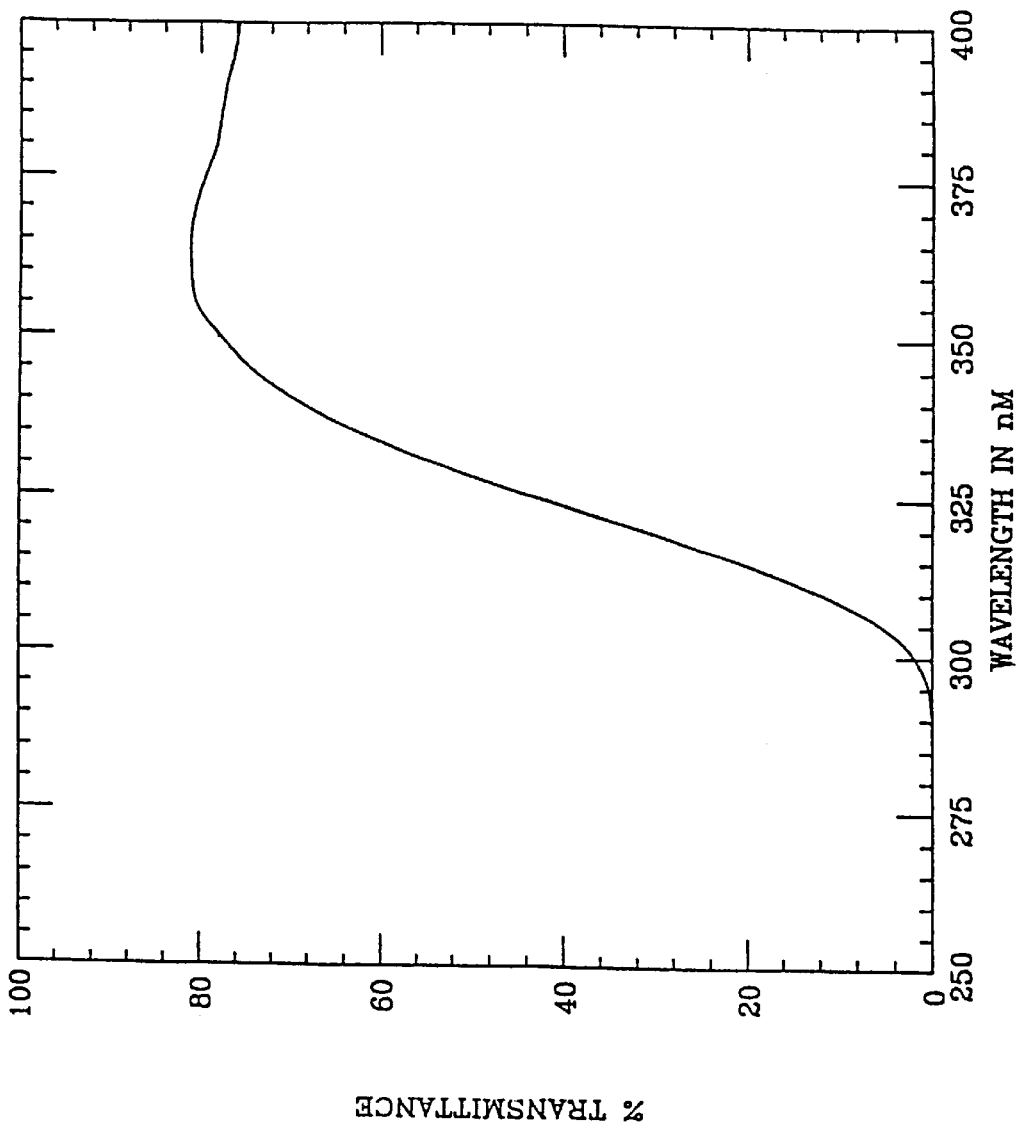
FIG. 3 is a graph of the percent transmittance of solar radition at various wavelengths through a piece of glass coated with a halt wave indium tin oxide coating.
Figure 4:
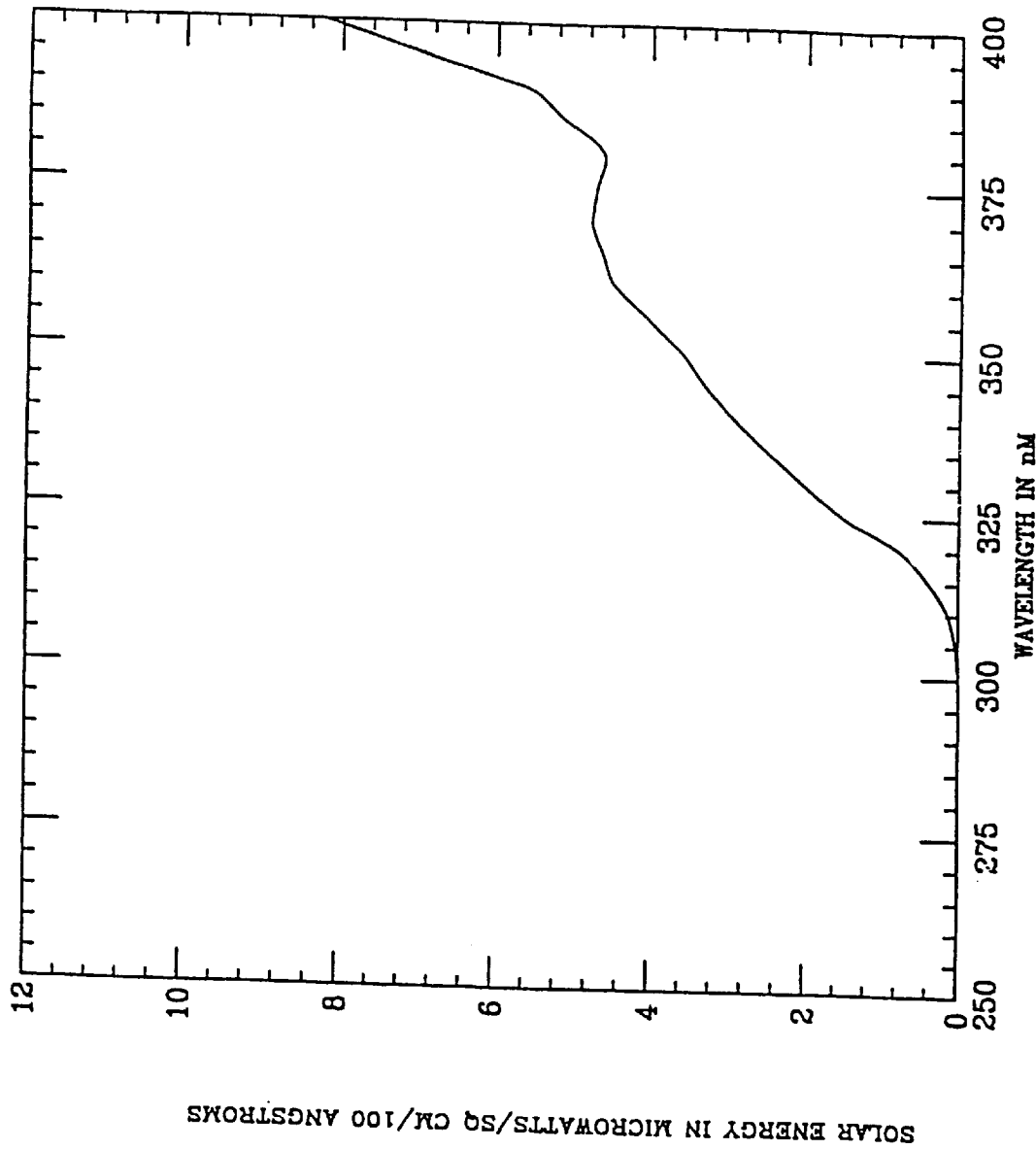
FIG. 4 is the solar spectrum passed by a piece of glass coated with half wave indium tin oxide.

The solar spectrum in the ultraviolet (UV) region incident at a desert location such as Tucson, Ariz., is shown in FIG. 1. The Y ordinate is the solar energy expressed in microwatts/$cm^2$/100 Å band. This solar spectrum must typically pass through an ITO coated glass front piece to irradiate the solution in an electrochemichromic cell 1 as shown in FIG. 2. The transmission of ITO coated glass (0.063" sodalime coated to half wavelength thickness with 1500 Å ITO) is shown in FIG. 3. Thus the solar energy spectrum transmitted into the electrochemichromic fluid is the convolution of FIG. 1 with FIG. 3. This is shown in FIG. 4. The ITO coated glass passes about 55% of the incoming UV solar energy in the 250 to 350 nm region. Thus a substantial portion of the solar UV is unattenuated by the ITO coated glass front piece. This UV radiation passes into the electrochemichromic fluid where it irradiates the electrochemichromic species dissolved therein.

Figure 5:
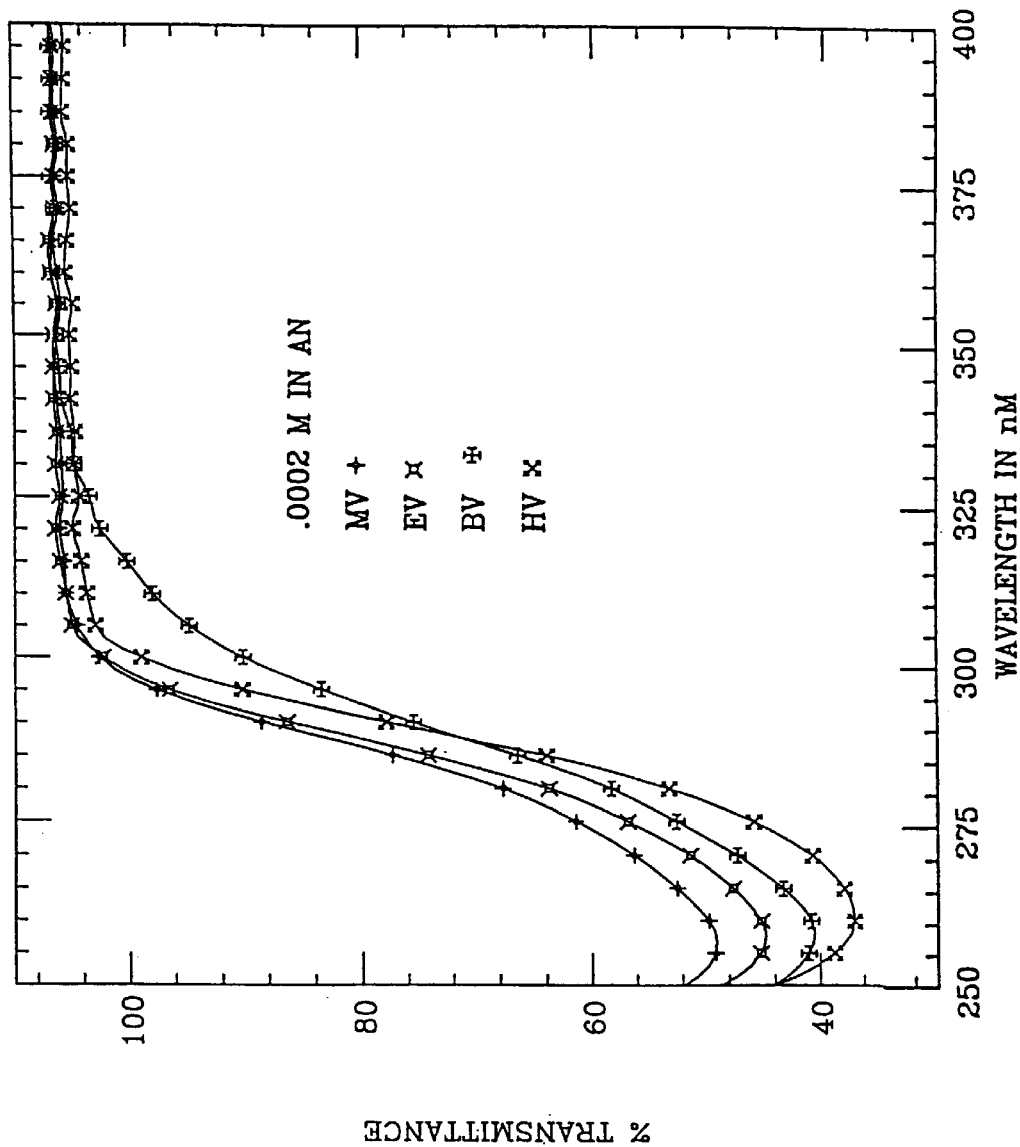
FIG. 5 is a graph of the percent transmittance of solar radiation at various wavelengths for 0.0002 molar acetonitrile solutions of various cathodic compounds typically used in electrochemichromic cells.
Figure 6:
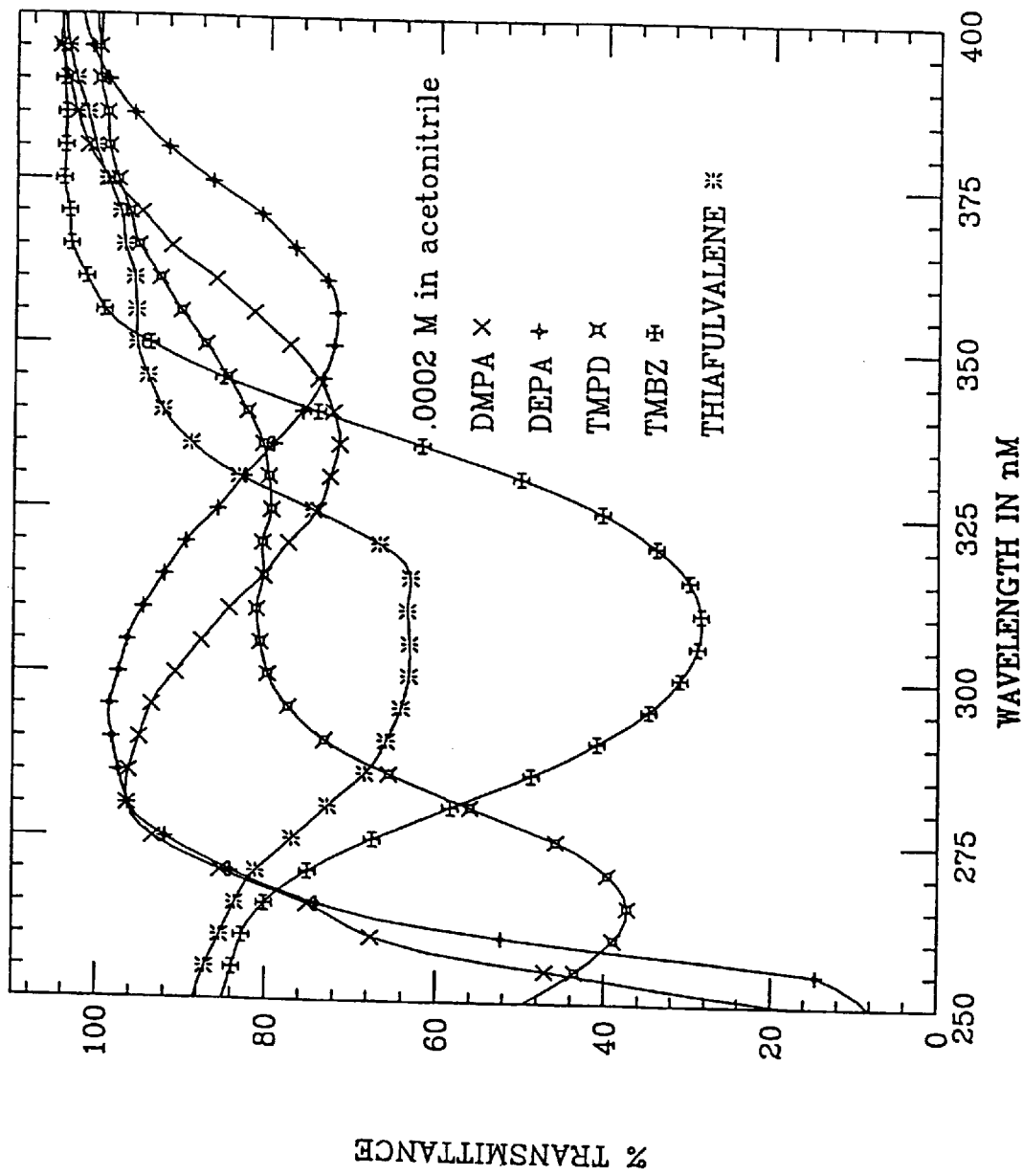
FIG. 6 is a graph of the percent transmittance of solar radiation at various wavelengths by 0.0002 molar acetonitrile solutions of various anodic compounds used in electrochemichromic cells.

As shown in FIG. 5, the cathodically coloring species most commonly used in prior art literature such as methylviologen (MV), ethylviologen (EV), benzylviologen (BV), and heptylviologen (HV) have an absorption peak below 295 nm and thus should be largely nonabsorbing to the solar UV transmitted into the electrochemichromic cell. However, as shown in FIG. 6, anodic compounds, such as dimethyldihydrophenazine (DMPA), diethyldihydrophenazine (DEPA), tetramethylphenylenediamine (TMPD), tetramethylbenzidine (TMBZ) and tetrathiafulvalene (TTF) have substantial UV absorbance in the 250 to 350 nm region. For example, DMPA in 0.0002M solution in acetonitrile (AN) and in a 1 mm pathlength quartz cell absorbs about 22% of the UV solar'spectrum passed by ITO coated glass in the 250 to 350,nm region.

Figure 7:
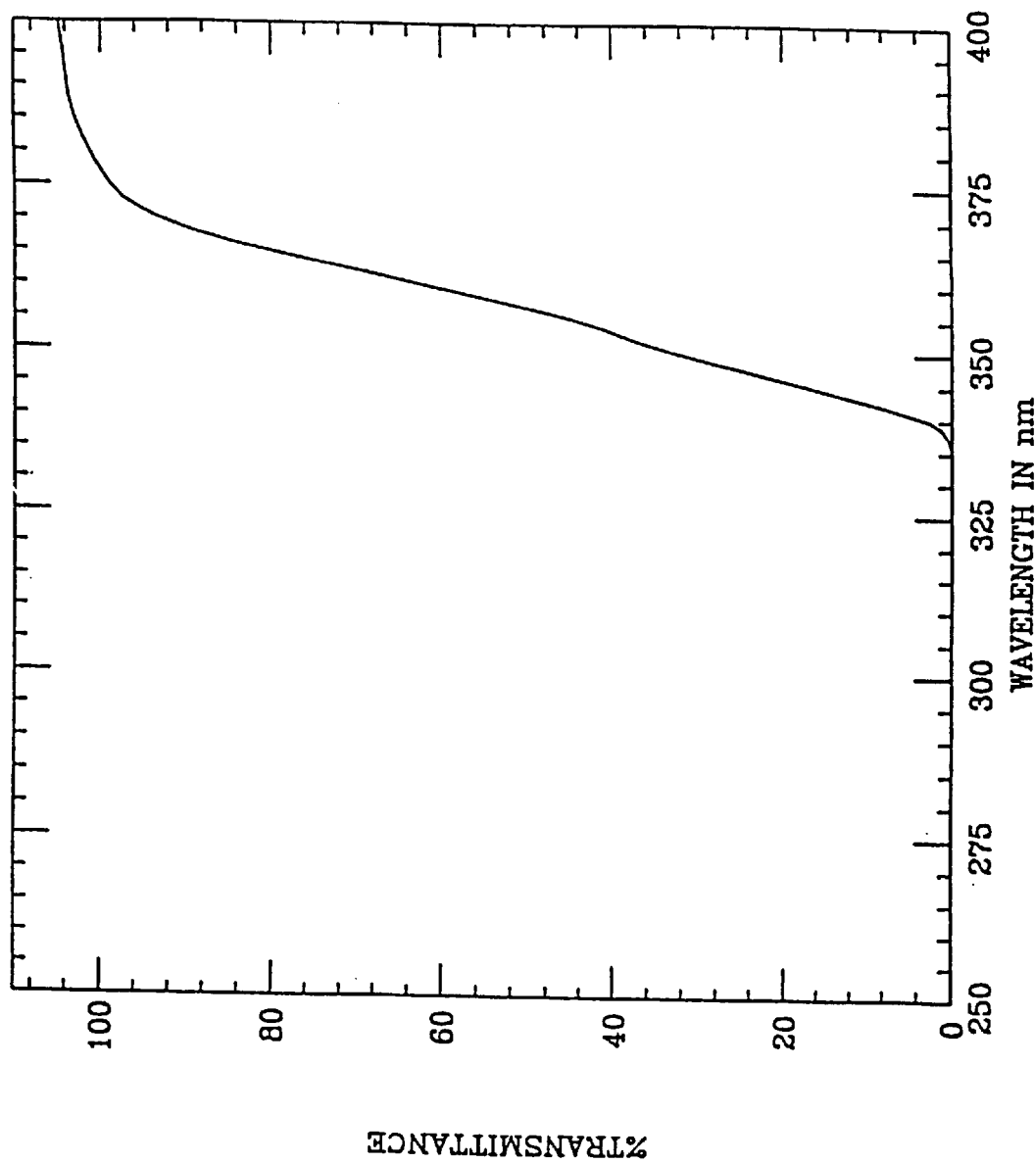
FIG. 7 is a graph of the percent transmittance of solar radiation at various wavelengths by the solvent ABL.

Thus, it is desirable to shield the electrochemichromic compounds from UV irradiation in this region. One aspect of the present invention involves the use of a solvent which self-screens solutes dissolved therein from the detrimental effects of UV radiation impinging thereon. Specifically, the solvent in a one millimeter path length must transmit no more than about 30, of the solar radiation in the 250 to 350 nm range passed through a typical transparent ITO coated glass substrate. Such a substrate would typically be soda lime glass of approximately 0.063 inch thickness, coated with a half wave (1500 Å) ITO transparent conductive layer. One of the solvents of the present invention, in addition to acting as solvent for electrochemichromic compounds such that the resulting electrochemichromic solution cycles well from a high transmitting state to a low transmitting state, has the additional beneficial property of self-absorbing substantial proportions of the UV solar insolation in the 250 to 350 nm region. FIG. 7 shows the transmission of such solvent, acetylbutyrolactone (ABL). The spectrum is taken in a 1 mm pathlength quartz cell. This 1 mm cell filled with ABL transmits from 250 nm to 350 nm only about 10% of the solar radiation passed by half wave (1500° A) ITO coated standard soda lime glass of a thickness of about 0.063 inches. This data can be compared to FIG. 8, which shows the UV transmission, in a 1 mm pathlength cell, for various solvents proposed in prior art for use in electrochemichromic solutions. Note that these are mostly completely transmitting in the ultraviolet region in that they absorb very little between 250 nm to 350 nm. For example, propylene carbonate in a 1 mm cell transmits about 87% of the solar energy passed through ITO coated glass between 250 nm and 350 nm; dimethylformanide (DMF) about 89%, acetonitrile (AN) about 100%; and methyethylketone (MEK) about 93%. Thus, ABL helps extend the UV lifetime of electrochemichromic solutions by shielding the UV fragile electrochemichromic compounds that are solutes in the UV self-screening solvent.

Self-screening by the solvent is more effective than screening with a UV inhibiting solute because the solvent is by far the majority component in the solution. For example in a 0.025M solution in ABL, the molarity of the solute is 0.025M while the molarity of the solvent is 9.29M so that there are roughly 370 solvent molecules for every solute molecule in solution. Thus, the probability is greatest that an incoming UV photon may impinge and be absorbed by a solvent molecule (which typically is UV resilient), rather than impinge and be absorbed by a solute molecule (which, in the case of electrochemichromic species, is usually UV fragile and degraded by UV irradiation).

Although addition of UV stabilizers such as benzotriazoles, benzophenones, or hindered amine complexes, as known in prior art, can help increase solution stability to UV radiation, there are limitations and disadvantages to addition of UV stabilizers. Because they are held in solutions of low to moderate viscosity, both the UV stabilizer and the electrochemichromic solution species it is intended to stabilize are free to randomly move about in the solution. Thus, an incoming photon of UV radiation may impinge and thus degrade an electrochemichromic solute species rather than a UV absorber in solution.

Also, solvent solubility places limits on the amount of UV stabilizer that can be added. Since UV stabilizers typically have molecular weights in the 250 to 400 range, the molarity of UV stabilizer in solution is typically around 0.2M or less if the stabilizer concentration is 5% wt/volume. Thus UV stabilizers outnumber solute by about 10 to 1 but the solvent outnumbers solute by about 350 to 1 and thus the inherent self-screening achievable by the solvent ABL, working in conjunction with dissolved stabilizer, can help enhance the UV-stability of electrochemichromic devices that use these types of UV self-screening solvents.

ADDITIONAL EXAMPLES

The following examples further illustrate the important and unexpected advantages of the solutions of the present invention over the prior art:

Example 1 (Prior Art DMF)

A self-erasing electrochemichromic cell solution was prepared based on the prior art of Shelepin, as taught in *Elektrokhimya*, 13(3), 404–408 (March 1977). This consisted of:

0.05M Methylviologen perchlorate 0.05M 5,10-dihydro-5,10-dimethylphenazine

10% weight/volume polymethylmethacrylate (90,000 average molecular weight) dissolved in dimethylformamide (DMF).

In addition, 0.05M tetraethylammonium perchlorate was added as inert current carrying electrolyte as taught in manos U.S. Pat. No. 3,451,741 (Jun. 24, 1969).

The solution was prepared under oxygen-free conditions and anhydrous argon gas was bubbled through the solution to further deoxygenate the solution. A roughly 23 cm×5.6 cm rectangular cell was fabricated according to the construction shown in FIG. 2. The cell cavity was formed by silk-screening a roughly 2 mm×150 micron epoxy seal around the edge perimeter of one of the ITO transparent conductive coated glass substrates shown in FIG. 2. Sheet resistance for the ITO transparent conducting coating used on both substrates-was about 15 ohms/square. Prior to its silk-screening, glass beads of nominal diameter 150 microns were mixed with the epoxy. Before curing of the epoxy, the second ITO coated glass substrate was contacted to the epoxy seal and the now laminated construction was baked in an oven to cure the epoxy. A small gap of approximately 2 mm×1 mm×150 micron dimension had been allowed in the epoxy seal so that, upon lamination, a small fill hole was available close to one corner of the seal through which fluid could flow during the vacuum backfilling process. Attempts at room temperature to vacuum backfill this solution failed. When vacuum was applied, the DMF-based solution boiled and could not be filled into the cell cavity.

With this prior art solution, two fill holes were drilled through the face of one of the ITO coated glass substrates so that fluid could be filled into the cell cavity using suction at one hole to pull solution from a syringe tightly held to the other hole. Each hole was of approximately 1 mm diameter. For this construction, no fill hole was allowed in the epoxy seal.

After the DMF-based electrochemichromic solution described above was filled into the cell cavity using suction pull through from a syringe, the holes drilled through the glass substrate were plugged with epoxy. Using this nonvacuum backfilling technique,.the prior art DMF solution could be successfully filled into the cell cavity. This filling technique, although practical at a laboratory or prototype level, has disadvantages for commercial devices which include difficulties in securely plugging the relatively large fill holes drilled through the glass substrate.

Consistent with prior art teachings, electrochemichromic windows and mirrors, produced as described above and using the DMF-based formulation from prior art, were found to have the variable transmission (or variable reflection in the case of mirrors), cycle lifetime and coloration efficiency required to render single-compartment, self-erasing, solution-phase electrochemichromic devices commercially practical.

For example, a roughly 129 $cm^2$ window was constructed of dimension 23 cm×5.6 cm×150 microns cell thickness. When filled with the prior art DMF-based formulation, and where a silver mirror reflector was placed behind this window, the reflectance from the mirror, which initially was 81.3% R, dimmed rapidly to about 27.2% R as measured at the center of the rectangular device.

To dim the mirror reflectance, a potential of 1 volt was applied to bus bars that ran lengthwise along the outer perimeter of the ITO coated transparent substrates that sandwiched the DMF-based electrochemichromic solution. Upon removing the applied potential, the electrochemichromic solution self-erased back to a clear state so that the mirror reflectance returned to 81.3% R. Alternatively, the cell could be more rapidly bleached by shorting the electrodes. Cycle lifetime was established by applying 1 volt potential across the electrochemichromic solution for 30 seconds to dim the transmission, followed by shorting the cell electrodes for 30 seconds to bleach back to the clear state. This color for 30 seconds followed by bleach for 30 seconds cycle was continued for over 10,000 cycles. Coloring efficiency was maintained; the clear state reflectivity remained high while the cell continued to dim in its center to about 27% R.

However, there are three significant disadvantages to using this prior art DMF-based formulation for commercial applications. The large leakage current which was in excess of 8 A/m$^2$ would lead to undesirable power drain in practical devices and particularly in large area window or mirror devices. Also, although coloration was efficient as seen by the deep coloration close to the bus bars, coloration was very nonuniform, even for this relatively small window of 129 cm$^2$ area. Also, although thickener was added as suggested by prior art to limit segregation, segregation was nevertheless present even after relatively modest prolonged coloration. For these reasons, coupled with the impracticality of using vacuum backfilling, this prior art DMF-based solution was seen to be inferior to mirror and window devices made possible by the solutions of this present invention.

Example 2 (HPN Solution)

A self-erasing electrochemichromic solution was formed of:

0.025 M Methylviologen perchlorate 0.025M 5,10-dihydro-5,10-dimethylphenazine 0.025 H Tetraethylammonium perchlorate 5% weight/volume 2,4-dihydroxy-benzophenone (UV stabilizer "Uvinul 400™" dissolved in hydroxyproprionitrile (HPN).

This solution was filled using vacuum backfilling into an interior rearview mirror shaped window constructed as per FIG. 2 of length about 24 cm and width about 5 cm, and of cell area about 110 cm$^2$. The interpane gap was 150 microns. Glass coated with ITO of sheet resistance 15 ohms/square and greater than 85% visible transmittance was used. A silver mirror reflector was placed behind the window. Without any applied voltage, the cell was clear and colorless and the reflectance from the mirror was about 81.5% R. When 1 volt potential was applied-across the call, reflectance of the mirror was reduced to 7.5% R, as measured at the center of the window device. Color transition time from 70% R to 20% R was 3.7 seconds. When the electrodes were shorted, bleach time from 10% R to 60% R was 5.4 seconds. Coloration was both efficient and satisfactorily uniform. Leakage current was about 6.8 A/m$^2$.

After prolonged colored for 30 minutes, segregation performance as evidenced by a blue band adjacent to the cathodically powered bus bar and a yellow/brown band adjacent to the anodically colored bus bar was small. Segregation performance and uniformity were greatly improved over that seen in Example 1, even though no additional thickening agents such as are taught to be necessary in Shelepin, supra Example 1, and in Byker European Patent Publication 240,226 were used. Nor was the use of a high concentration of current-carrying salt necessary, such as is taught to be necessary for commercial practicality of the solutions taught in Byker European Patent Publication 240, 226.

The HPN-based formulation has the coloring efficiency and uniformity required to be commercially practical and it showed unexpectedly excellent cycle lifetime. Cells fabricated as described in this example have been cycled in excess of 100,000 cycles without any significant deterioration in the performance described above. Each cycle consisted of 30 seconds color at 1V applied, and 30 seconds bleach at 0V applied, i.e., with the electrodes shorted. The cell is undamaged when subjected to prolonged coloration. Performance is maintained after baking at 85° C. for two weeks. Cells are not damaged by prolonged storage at low temperatures of −20° C. or lower. The formulation described here is sufficiently UV stable, at least for use in the interior cabin of an automobile.

Example 3 (ABL Solution)

A self-erasing electrochemichromic solution was formulated as described in Example 2, but using 2-acetylbutyrolactone (ABL) as the solvent. When filled into a cell as described in Example 2, and with a silver mirror reflector placed behind the window, mirror reflectance was 80.1% R in the clear state, which dimmed to 6.7% R when 1 volt was applied. Color time to din from 70% R to 20% R was 3,9 seconds. Leakage current was about 3.8 A/m$^2$. Bleach time from 10% R to 60% R was 9.4 seconds and thus was adequate for an automotive rearview mirror application, and very acceptable in a window application. Coloring efficiency and coloring uniformity were excellent, as was segregation performance which was exceptionally good. Cells formulated according to this example have excellent cycle lifetime-with in excess of 86,000 30 second color; 30 second bleach cycles tested without any significant deterioration in performance. The high temperature, low temperature, and UV performance for this solution are similar to that reported above in Example 2.

The low leakage current discovered in ABL solutions makes this formula particularly well suited for use in large area windows and mirrors where voltage drops across transparent conductors due to excessive leakage currents leading to undesirable and commercially impractical nonuniform coloration along with excessive segregation, Example 4 (50:50 HPN/ODPN)

A self-erasing electrochemichromic solution was formulated as described in Example 2, but using a mixture of 50% by volume HPN and 50% by volume ODPN as solvent. Using this solvent mixture, this solution was filled into a cell as described in Example 2. With a silver mirror reflector placed behind the window so formed, the initial reflectance of 79.6% R dimmed to about 6.6% R when 1 volt was applied across the cell. Color time from 70% R to 20% R was 3.5 seconds. Moreover, the bleach time from 10% R to 60% R was about 7.3 seconds which is intermediate between the 5.4 seconds found using pure HPN and the greater than 10 seconds found using pure ODPN. Leakage current was about 4.8 A/m$^2$. Thus, a solvent that shows the surprisingly and unexpectedly low leakage current found with ODPN can be proportionately combined with a higher leakage current solvent such as HPN of this invention or propylene carbonate from prior art, so that the leakage current of the resultant mixture can be customized to suit the commercially desirable performance of the specific product involved. Since a low leakage current solvent gives better color uniformity and lower segregation, but typically also leads to a slower bleach response, solvents such as HPN and ODPN can be mixed to yield the optimum compromise between color uniformity and segregation performance and bleach response time.

Electrochemichromic solutions, as described in this example, that utilize a 50:50 mixture of HPN and ODPN have the commercially required high temperature, low temperature, and UV performance required for commercial use. Their cycle lifetime is excellent. They show no significant change in performance after 48,000 cycles at +25° C., 6,000 cycles at +40° C., and 6,000 cycles at −20° C., each cycle consisting of coloring at 1 volt applied potential for 15 seconds, and 0 volt applied potential for 15 seconds.

Example 5 (ODPN, MS, MGNT)

Solutions were formulated, and devices fabricated and tested as described in Example 2, but using oxydipropionitrile (ODPN) as the solvent. Excellent cycle lifetime, coloring efficiency, coloring uniformity, high temperature, low temperature, and ultraviolet performance was achieved. Likewise, excellent performance was recorded with the other solvents novel to this invention, 2-methylglutaronitrile and 3-methylsulfolane, whether used as pure solvents or as mixtures among themselves, or with HPN and ABL, or with prior art solvents such as propylene carbonate.

Example 6 (Prior Art PC)

To illustrate the benefit of customizing leakage current so that coloration uniformity, low segregation, and bleach response is optimized, square windows of dimension 14 cm×14 cm×150 micron cell thickness were fabricated according to the construction schematically shown in FIG. 2. A window so constructed that used ITO of sheet resistance about 25 ohms/square was filled with a solution comprising:

0.025M Methylviologen perchlorate 0.025M 5,10-dihydro-5,10-dimethylphenazine 0.025H Tetraethylammonium perchlorate in pure propylene carbonate.

Bus bars were attached around the perimeter edges and a potential of 1 volt was applied. At rest potential, the electrochemichromic window so formed was about 86% transmitting. This window colored deeply immediately adjacent to the bus bars, but did not color in the center, such that such a window would be commercially unacceptable. Also, when this window was prolonged colored at 1 volt for 15 minutes, very significant segregation of the reduced cathodic species to the one bus bar and the oxidized anodic species to the other bus bar was seen.

When another cell was filled with this solution, but this time using ITO of sheet resistance about 15 ohms/square as the transparent conductors that sandwiched the electrochemichromic solution, the center of the window still failed to dim appreciably when 1 volt was applied. The center dimmed only to about 40% T (although, as can be expected given the lower sheet resistance of ITO used, the colored region closer to the bus bars increased somewhat in area, while the central nondimmed area proportionally decreased in size). Segregation after prolonged coloration at 1 volt for 15 minutes was improved over what was seen as described above when this solution had been used in a cell that utilized 25 ohms/square ITO but was nevertheless still significant.

Example 7 (ODPN in 15 ohms/square ITO Cell)

By contrast, when a similar cell to that described in Example 6 was filled with equivalent electrochemichromic solution, but this time using the ODPN of this invention and using 15 ohms/square ITO, the central region dimmed appreciably (down to 14% T) and uniformly such that the window would be commercially practical. Segregation after prolonged coloration at 1 volt for 15 minutes for the ODPN-based solution was only slight to negligible and was demonstrably superior to the windows described above that utilized propylene carbonate based solutions. Applications such as large area architectural and automotive windows, office partition panels, and large area mirrors become practical using the low leakage current solvents, such as ODPN, of this invention.

Example 8 (Ethylviologen in HPN/ODPN)

A self-erasing, electrochemichromic solution was formulated comprising:

0.025 H ethylviologen perchlorate 0.025 H 5,10-dihydro-5,10-dimethylphenazine 0.025M Tetraethylammonium perchlorate 5% weight/volume 2,4-dihydroxy-benzophenone (UV stabilizer Uvinul 400 dissolved in a 50:50 hydroxypropionitrile (HPN)/oxydipropionitrile (ODPN) mixture.

When filled into a 24 cm×5 cm×150 micron cell, as described in Example 2, a silver mirror reflector placed behind the window so formed had a reflectivity of 80.1% R which dimmed to 6.7% R when 1 volt was applied across the ITO transparent conductors (of 15 ohms/square sheet resistance) used. Coloration was rapid (3.4 sec) and bleach response was satisfactory. Excellent coloration efficiency and coloration uniformity were maintained after cycle lifetime testing in excess of 60,000 cycles; each cycle consisting of 1 volt applied for 30 seconds, followed by 0V applied for 30 seconds.

Example 9 (TMPD Anodic Material In HPN/ODPN)

A self-erasing electrochemichromic solution was formulated comprising:

0.035 M methylviologen perchlorate 0.035M N,N',N'-tetramethyl-1,4-phenylenediamine 0.035M Tetraethylammonium perchlorate 5% weight/volume Uvinul-400™ dissolved in a 50:50 mixture of hydroxypropionitrile (HPN) and oxydipropionitrile (ODPN).

When an electrochemichromic window was assembled, as essentially described in Example 2, the clear, zero potential transmission was about 81% T and this decreased to about 11% T when a potential of 0.6V was applied across the cell. Coloration from 70% to 20% T took about 7.3 seconds, bleach from 11% T to 60% T took about 7 seconds. Upon fully bleaching at zero potential, the transmission returned to the clear, high transmitting state. When repetitively cycled at 0.6V for 30 seconds followed by 0V for 30 seconds, the performance cited above was essentially maintained.

Example 10 (TTF Anodic Material In HPN/ODPN

A self-erasing electrochemichromic solution was formulated comprising:

0.025M methylviologen perchlorate 0.025M Tetrathiafulvalene 0.025H Tetraethylammonium perchlorate dissolved in a 50:50 mixture of hydroxypropionitrile (HPN) and oxydipropionitrile (ODPN).

When an electrochemichromic window was assembled, as essentially described in Example 2, the clear, zero potential transmission was about 80.3% T. When a potential of 1.0V was applied across the cell and with a silver mirror reflector behind the window, the mirror reflectance dimmed from its initial high reflectance state of 80.3% R down to a low reflectance state of 5.8% R coloration time from 70% to 20% R was 3.2 seconds; bleach from 10% R to 60% R took 7.1 seconds.

Example 11 (HPN/ABL-Variable Transmission)

A window was formed as described in Example 2 consisting of:

0.025M Methylviologen perchlorate 0.025M 5,10-dihydro-5,10-dimethylphenazine 0.025M Tetraethylammonium perchlorate in a 50:50 mixture of hydroxypropionitrile (HPN) and acetylbutyrolactone (ABL).

This cell was powered at various voltages from 0V to 1.2V. The transmission at the center of this window, at various applied voltages, is shown in Table 4.

TABLE 4

| Applied Voltage Volts | % Transmission |
|---|---|
| 0 V | 78.9 |
| 0.2 V | 78.9 |
| 0.6 V | 46.2 |
| 0.7 V | 31.4 |
| 0.8 V | 21.4 |
| 0.9 V | 14.8 |
| 1.0 V | 11.3 |
| 1.1 V | 8.6 |
| 1.2 V | 7.3 |

As can be seen from the Table, % transmission can be varied between 78.9% T and 7.3% T by appropriately selecting the applied voltage. This ability to operate as a grey scale was found in all the novel solvents and solvent mixtures disclosed in this invention, and is consistent with prior art teachings and with the intrinsic properties of the electrochemichromic species themselves.

Example 12 (HPN)

A self-erasing electrochemichromic solution was formed of:

0.035M Methylviologen hexafluorophosphate 0.0.035M 5,10-dihydro-5,10-dimethylphenazine 0.035H Tetrabutylammonium hexafluorophosphate dissolved in hydroxypropionitrile (HPN).

This solution was filled using vacuum backfilling into an interior rearview mirror shaped window constructed as per FIG. 2 of length 24 cm and width 5 cm, and of cell area 110 cm . The interpane gap was 150 microns. Glass coated with ITO of sheet resistance 15 ohms/square and greater than 85% visible transmittance was used. A silver mirror reflector was placed behind the window. Without any applied voltage, the cell was clear and the reflectance from the mirror was about 78.8% R. When 1 volt potential was applied across the cell, reflectance of the mirror was reduced to 5.8% R, as measured at the center of the window device. Color transition time from 70% R to 20% R was 3.8 seconds. When the electrodes were shorted, bleach time from 10% R to 60% R was 5.6 seconds. Coloration was both efficient and satisfactorily uniform. The EPN-based formulation has the coloring efficiency and uniformity required to be commercially practical and it showed unexpectedly excellent cycle lifetime. Cells fabricated as described in this example were cycled without any significant deterioration in the performance described above. Each cycle consisted of 30 seconds color at 1V applied, and 30 seconds bleach at 0V applied, i.e., with the electrodes shorted. The cell is undamaged when subjected to prolonged coloration. Performance is maintained after baking at 85° C. for two weeks. Cells are not damaged by prolonged storage at low temperatures of −20° C. or lower. The formulation described here is sufficiently UV stable, at least for use in the interior cabin of an automobile.

Example 13 (Commercial Cell Comparison)

The practical benefit of these concepts can be illustrated by comparing the UV stability of a rearview mirror fabricated using the concepts of this invention to the UV stability of a commercially available electrochemichromic rearview mirror. The particular commercially available electrochemichromic mirror tested was an interior rearview mirror purchased from General Motors spare parts around July 1989 and it was marked A105/1.16 on its rear surface. Analysis of these commercially available mirrors shows that their solutions contain benzylviologen (BV) and 5,10-dihydro-5,10-dimethylphenazine (DMPA) in propylene carbonate and also contain a benzothriazole UV stabilizer. Our electrochemichromic rearview mirrors consisted of: 0.025 M methylviologen perchlorate; 0.025M dimethydihydrophenazine; 0.025M tetraethylammonium perchlorate; 5% by weight 2,2'-dihydroxy-4-methoxybenzophenone (Cyasorb $_{24}$™) as UV stabilizer all dissolved in 50% HPN:50% ABL and in 50% ABL:50% ODPN. Ail three mirrors were exposed for 89 hours to a xenon arc lamp and were irradiated with UV radiation that closely simulated the solar UV intensity. The integrated intensity from 250 nm to 400 nm was around 70 watts/$M^2$. Results were:

| | HI %R | LOW %R | Color 70%–20%R Sec | Bleach 10%–60%R Sec |
|---|---|---|---|---|
| Initially | | | | |
| Commercially Available ECCM | 79.9 | 6.6 | 2.95 | 4.22 |
| HPN/ABL 50/50 | 80.9 | 8.1 | 2.06 | 8.16 |
| ABL/ODPN 50/50 | 81.7 | 8.9 | 2.39 | 12.22 |
| 89 Hour UV Exposure | | | | |
| Commercially Available ECCM | 59.6 | 7.6 | 2.72* | 6.05 |
| HPN/ABL 50/50 | 80.6 | 6.6 | 1.66 | 7.64 |
| ABL/ODPN 50/50 | 79.6 | 9.4 | 2.55 | 11.62 |

*59.6%R to 20%R

The formulations in accordance with the present invention performed remarkably better than the commercially available formulation in that they maintained their high reflectance state of about 80% R, whereas the commercial product dropped its zero potential reflection to only about 60% R, principally due to its yellowing.

Of course, it is understood that the above is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A large area variable transmission electrochromic window suitable for use as at least one of an architectural window, an automotive window, and an office partition panel comprising:

first and second spaced optically transparent elements, said elements each having front and rear surfaces and defining a space between the rear surface of said first element and the front surface of said second element;

an electrochromic medium confined in said space whose light transmission is variable upon the application of an electric field thereto;

means for applying an electric field to said electrochromic medium to cause variation in the light transmittance of said medium wherein said means for applying an electric field include a substantially transparent conductive coating on at least one of said rear surface of said first element and said front surface of said second element, said substantially transparent conductive coating having a sheet resistance of 25 ohms/square or lower and selected from the group consisting of indium tin oxide, doped tin oxide, and doped zinc oxide;

said electrochromic medium including a redox chemical pair which colors under the application of voltage;

said electrochromic medium further including an ultraviolet stabilizer whereby said redox chemical pair is provided with enhanced ultraviolet stability;

said electrochromic window having an electrochromically active large area of length dimension at least about 14 cm and of width dimension at least about 14 cm; said electrochromic window exhibiting a steady state leakage current of less than about 2.68 amperes per square meter when a potential of one volt is applied to said electrochromic window whereby coloration uniformity of said electrochromic window is enhanced.

2. The window of claim 1 wherein said ultraviolet stabilizer is selected from the group consisting of benzophenones and cyanoacrylates.

3. The window of claim 2 wherein said ultraviolet stabilizer is selected from the group consisting of 2, 4-dihydroxybenzophenone, 2,2'-dihydroxy-4-methoxybenzophenone, and 2-ethylhexyl-2-cyano-3, 3-diphenyacrylate.

4. The window of claim 1 wherein said ultraviolet stabilizer has a concentration in said electrochromic medium of at least approximately 5% weight/volume.

5. The window of claim 4 wherein said ultraviolet stabilizer is a benzophenone.

6. The window of claim 4 wherein said ultraviolet stabilizer is a cyanoacrylate.

7. The window of claim 1 wherein said redox chemical pair includes a viologen species.

8. The window of claim 1 wherein said redox chemical pair comprises a viologen species and at least one compound selected from the group consisting of phenazines, phenylenediamines, benzidenes and fulvalenes.

9. The window of claim 8 wherein said phenazine compound is selected from the group consisting of 5, 10-dihydro-5, 10-dimethylphenazine, 5, 10-dihydro-5, 10-diethylphenazine and 5, 10-dihydro-5, 10-dioctylphenazine.

10. The window of claim 8 wherein said phenylenediamine compound is N, N, N', N'-tetramethylphenylenediamine.

11. The window of claim 8 wherein said benzidene compound is N, N, N', N'-tetramethylbenzidene.

12. The window of claim 8 wherein said fulvalene compound is tetrathiafulvalene.

13. The window of claim 1 wherein said redox chemical pair includes a phenazine compound.

14. The window of claim 13 wherein said phenazine compound is selected from the group consisting of 5, 10-dihydro-5, 10-dimethylphenazine, 5, 10-dihydro-5, 10-diethylphenazine and 5, 10-dihydro-5, 10-dioctylphenazine.

15. The window of claim 1 wherein said sheet resistance is 15 ohms/square or lower.

16. The window of claim 15 wherein said substantially transparent conductive coating is indium tin oxide.

17. The window of claim 15 wherein said substantially transparent conductive coating is doped tin oxide.

18. The window of claim 15 wherein said substantially transparent conductive coating is doped zinc oxide.

19. The window of claim 1 wherein said substantially transparent conductive coating is indium tin oxide.

20. The window of claim 1 wherein said substantially transparent conductive coating is doped tin oxide.

21. The window of claim 1 wherein said substantially transparent conductive coating is doped zinc oxide.

* * * * *